Jan. 2, 1968      N. H. SACHNIK      3,361,407
THROTTLING VALVE AND SEATS THEREFOR
Filed Aug. 26, 1964
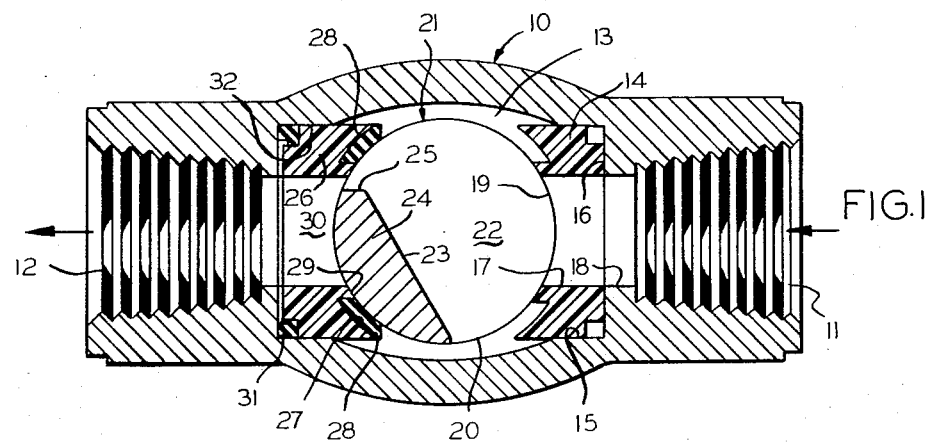
FIG.1
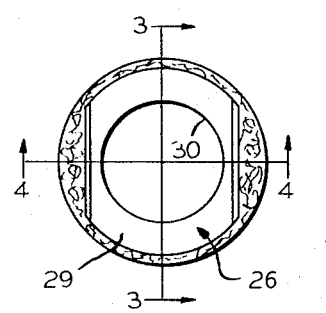
FIG.2
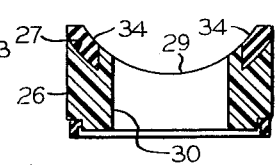
FIG.4
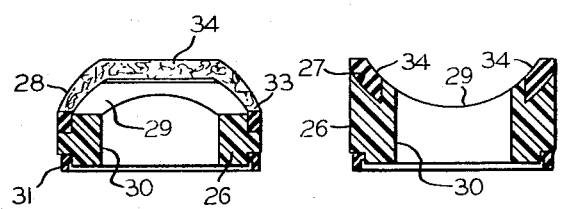
FIG.3
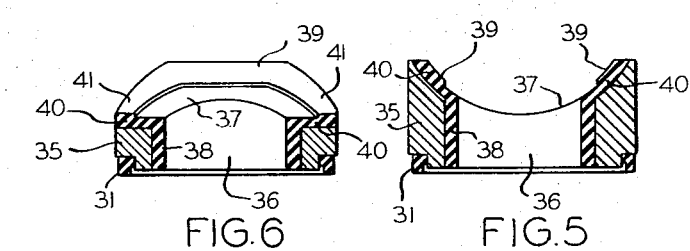
FIG.6     FIG.5
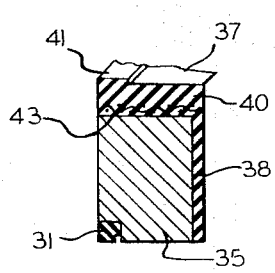
FIG.7
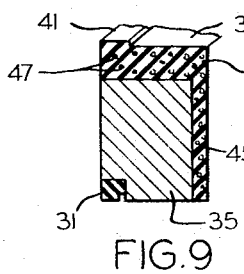
FIG.8
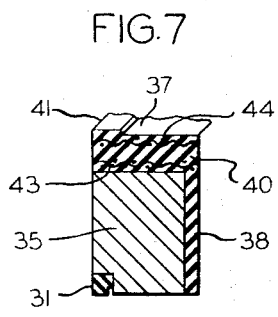
FIG.9     FIG.10
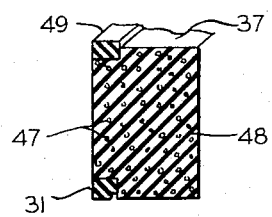
INVENTOR.
NORMAN H. SACHNIK
BY
ATTORNEY

United States Patent Office 3,361,407
Patented Jan. 2, 1968

---

3,361,407
THROTTLING VALVE AND SEATS THEREFOR
Norman H. Sachnik, Houston, Tex., assignor to
Texsteam Corporation
Filed Aug. 26, 1964, Ser. No. 392,129
5 Claims. (Cl. 251—317)

This application is a continuation-in-part of my co-pending application Ser. No. 326,557, filed Nov. 27, 1963, now Patent No. 3,314,643.

This invention, in general, relates to fluid flow control valves which have particular application as throttling valves adapted to control or throttle passage of fluids therethrough and like uses and to seats useful therein. Among the improvements in throttling valve structures provided by the invention are improvements in valve seat structures for seating a rotatable plug serving as the movable flow control member in the valve.

Seats for the movable plugs of throttle valves at the downstream end thereof are subject to severe demands. The plugs ordinarily have a passage defined therein through which the fluid flows, the amount or rate of flow depending upon the positioning of the plug relative to passage in the seat. Therefore, in order to provide best regulation of the throttling function, the plug must be seated sealingly in the throttling seat of the valve body. This invention pertains to improvements in seats for rotatable plugs or like members in valves, especially throttling valves.

It is, therefore, an object of this invention to provide improvements in valves useful in throttling applications.

Another object of this invention resides in the provision of throttling valves with improved seats for the rotatable throttling members of said valves.

Another object of the invention is to provide improved seats for rotatable valve members, said seats embodying compressible lips contacting the rotatable member and sealing the space therebetween against fluid flow.

Still another object of the invention is to provide improvements in throttling, downstream seats for throttling valves.

Another object of the invention resides in the provision of a throttling valve having a plug coacting with upstream and downstream seats of said valve, the downstream seat having lips of resilient or compressible material coacting with the plug to provide a positive seal.

Other objects, features, and advantages of the invention will be apparent from the following detailed disclosure, taken in conjunction with the accompanying drawings, wherein like reference numerals refer to like parts and in which:

FIG. 1 is a longitudinal, vertical section taken through a preferred embodiment of a throttling valve of the present invention;

FIG. 2 is a top plan view of the downstream seat shown in FIG. 1;

FIGS. 3 and 4 are sectional views taken on planes 3—3 and 4—4, respectively, of FIG. 2;

FIGS. 5 and 6 are sectional views of another embodiment of the downstream valve seat, the section planes of which views correspond to the section planes of FIGS. 3 and 4, respectively; and FIGS. 7–10 each are fragmentary, sectional views of an end of four additional embodiments of downstream seats taken on section planes of said additional embodiments corresponding to the plane of FIGS. 3 and 6.

Referring now to the drawings, the valve of the present invention includes a body 10 having a tapped inlet port 11, a tapped outlet port 12 coaxially aligned with the inlet port, and a flow control chamber or valve chamber 13 positioned intermediate the inlet and outlet ports. The body 10, preferably, is made of ductile iron, although any other suitable material may be employed.

A ring-shaped guide seat 14 is mounted within the chamber 13 in a cylindrical bore 15 which is coaxial with ports 11 and 12. The guide seat 14 seats against the ring-shaped shoulder 16 at the downstream or outlet end of the inlet port 11. The guide seat 14 has a cylindrical, axial passage 17 coaxial with and of the same diameter as a cylindrical wall 18 at the outlet or downstream end of the inlet port.

The downstream end of seat 14 has a circularly curved seat or saddle 19 matingly receiving the cylindrical wall 20 of the rotatable valve plug 21. The valve plug 21 has a cylindrical valve body portion with its rotational axis extending perpendicular to the axes of the seats and ports. The plug preferably is constructed of an erosion and corrosion resistant metal or other material.

The plug 21 is formed to enable a throttling orifice to be defined ahead of the throttling seat 26 and outlet orifice 12 while permitting free flow through the guide seat 14 and inlet port 11. A transaxially cut out portion extends more than 180° around the periphery of the plug 21 and includes parallel side walls 22 spaced apart a distance approximately equal to the diameter of the passage 17 and coaligned with opposite diametric points on both passage 17 and passage 30 of the throttle seat 26. A transversely arcuate, sloping wall or face 23 on a neck or bridge portion defining a flow control member 24 interconnects the innermost edges of the side walls 22. The edge surface 25 is somewhat flatted to provide a vertically arcuate wall to coact with the throttling seat 26 and define a restrictive orifice. By somewhat flatting the surface 25, turbulence beyond the orifice is minimized. The dimension of the flow control member 24 is such that, when the plug is rotated to fully open the valve, a substantially unobstructed passageway is defined between the inlet and outlet ports. The flow control member 24 may be oriented to cover fully the passage 30 of seat 26 to provide a shut-off function. Further details of the valve plug 21 and its mounting in valve body 10 may be found in my aforesaid copending application.

The throttle seat 26 is a ring-like core of rigid material such as metal, phenol-formaldehyde resin, etc., having a circularly curved, upstream seat or saddle 29 in which is matingly seated the cylindrical plug 21. The outer edges of saddle 29 are recessed relative to the central portion of the rigid core to provide a peripheral groove 27 in which is fixedly seated a ring-like seal member 28 of a suitable elastomer or other compressible or resilient material. The saddle 29 is intercepted centrally by the passage 30 extending axially through the throttling seat.

The seat 26 is positioned in a cylindrical seat 32 in valve body 10. Fluid escape via seat 32 is prevented by the sealing function provided by elastomer seal ring 31 compressed between the side and bottom walls of seat 32 and the outer, downstream edge of throttling seat 26.

The ring-like seal member 28 occupies only the outer areas of seat 29 whereby the rigid, central portion of the seat is utilized as a major load-bearing and wear-resistant face of the seat 29. Contiguous portions of the upstream face of the seal member 28 may be flush, arcuate continuations of the curved face of the central portion of the seat, if desired. The upstream face of seal member 28 has lips 33 and 34 extending above the arcuate continuations of the central portion of saddle 29 so that these lips are compressed or resiliently distorted when the cylindrical wall of plug 21 bears tightly against the central portion of the saddle 29. This provides a seal at said lips against fluid loss between the contacting parts of plug 21 and lips 33 and/or 34 to improve throttling control by restricting fluid flow to flow through only the passage in the plug 21 and passage 30.

The throttling seat embodiment illustrated in FIGS. 5 and 6 is like in many respects to the throttling seat embodiment heretofore described. It comprises a ring-like, rigid body member 35 having a central fluid passage 36 intercepting the arcuate saddle or seat 37 for plug 21. The passage 36 is lined with cylindrical sleeve or facing 38 made of an elastomer or other suitable material. The sleeve 38 is formed as an integral part of an arcuately curved lining or facing 40 made of elastomer or other suitable material and making up the entire face of the saddle 37. The lining has resilient continuous lips 39 and 41 similar to the lips previously described whereby the lips project outwardly from the lining to effectively define a stepped surface for sealing engagement with the plug. The outer, downstream edge of the throttle seat has thereabout the previously decsribed seal ring 31.

The embodiment of FIG. 7 is like in all respects to the embodiment of FIGS. 5 and 6 and embodies the additional feature of a wire cloth 43 with a hard facing, such as Colmony No. 6, Study Alloy or stainless steel, in the lower face of the elastomer facing 40 forming the saddle 37. The embodiment of FIG. 8 is similarly like in all respects to the embodiment of FIGS. 5 and 6 and additionally embodies wire cloths 43 and 44 with hard facing at the upper and lower faces of the elastomer facing 40. These wire cloths add rigidity to the facing 40.

The embodiment of FIG. 9 is similar to the embodiment of FIGS. 5 and 6 and differs in essence in the manufacture on the rigid core 35 of the sleeve 45, facing 46 and lips 41 from an elastomer or thermoplastic polymer binder having embedded therein wear-resistant particles 47 such as ceramic particles, metallic particles, tungsten carbide particles and the like. In the embodiment of FIG. 10, the entire body of the seat is a molding of elastomer or thermoplastic polymer binder 48 with the wear-resistant particles therein, the lips, e.g., lip 49, being an elastomer ring set around the periphery of the saddle 37 in a fashion like that shown for ring 28 in FIGS. 3 and 4.

The invention heretofore described pertaining to embodiments of throttle valves with cylindrical valve plugs and mating seats therefor can be employed with equal advantages in throttle valves with spherical valve plugs and mating seats therefor. Other types of passages through the plugs may be used, also, though to lesser advantage.

From the foregoing, it should be appreciated that the valve of the present invention provides a high standard of operation for controlling fluid flow in a line and is particularly adaptable for straight-through-flow in that turbulence upstream of the variable orifice is substantially reduced to thereby minimize erosive wear of the plug.

It will be understood that modifications and variations may be effected without departing from the scope of the novel concepts of the present invention, but it is understood that this application is to be limited only by the scope of the appended claims.

The invention is hereby claimed as follows:

1. A throttling valve comprising, a valve body having coaxially aligned inlet and outlet ports and a control chamber therebetween, a guide seat within said chamber at the outlet end of said inlet port, a throttling seat within said chamber at the inlet end of the outlet port, said seats being of rigid material and having circular passageways therethrough in coaxial alignment with said ports and opposed arcuate faces adjacent the plug, a plug rotatably mounted within said chamber between said seats and in engagement with the arcuate faces thereof to control fluid flow through the valve, said plug being cylindrical and having a transaxially extending cut-out portion adapted to coact with the inlet end of the circular passageway of said throttling seat to define a throttling orifice while maintaining full fluid flow through the inlet port and guide seat, a resilient, elastomeric member over the entire arcuate face of said throttling seat, a continuous, elastomeric, resilient lip portion integral wtih said member and projecting outwardly therefrom to define a stepped surface having relatively sharp opposite edges and such a width that greater than line sealing contact is made with the contacting portions of said plug against fluid loss.

2. A throttling valve as defined in claim 1, wherein said lip is located along the outer periphery of said throttling seat arcuate face.

3. A throttling valve as defined in claim 1, and an elastomer sleeve lining the circular passageway of said throttling seat.

4. A throttling valve as defined in claim 1, wherein said elastomeric member has embedded therein a wire cloth.

5. A throttling valve as defined in claim 1, wherein said elastomeric member has embedded therein particles of wear-resistant material.

References Cited

UNITED STATES PATENTS

| | | | |
|---|---|---|---|
| 2,987,295 | 6/1961 | Schenck et al. | 251—317 X |
| 2,728,551 | 12/1955 | Blackman | 251—317 |
| 2,886,282 | 5/1959 | Miller | 251—317 X |
| 2,903,235 | 9/1959 | Rodgers et al. | 251—358 X |
| 3,042,362 | 7/1962 | Kinney | 251—358 X |
| 3,133,722 | 5/1964 | McGuire et al. | 251—358 X |
| 3,168,279 | 2/1965 | Anderson et al. | 251—317 X |
| 3,194,534 | 7/1965 | Sachnik | 251—317 X |

FOREIGN PATENTS

| | | |
|---|---|---|
| 1,240,580 | 8/1960 | France. |

M. CARY NELSON, *Primary Examiner.*

R. C. MILLER, E. K. FEIN, *Assistant Examiners.*